(12) United States Patent
Bouty et al.

(10) Patent No.: US 8,701,822 B2
(45) Date of Patent: Apr. 22, 2014

(54) GAS-GUIDING PIPE COMPRISING A NOISE-ATTENUATING COVERING WITH VARIABLE POROSITY

(75) Inventors: Eric Jean-Louis Bouty, Pau (FR); Pierre-Luc Regaud, Pau (FR); Antoine Yvan Alexandre Vallon, Pau (FR)

(73) Assignee: Turbomeca, Bordes (FR)

( * ) Notice: Subject to any disclaimer, the term of this patent is extended or adjusted under 35 U.S.C. 154(b) by 0 days.

(21) Appl. No.: 13/578,742

(22) PCT Filed: Feb. 11, 2011

(86) PCT No.: PCT/FR2011/050296
§ 371 (c)(1),
(2), (4) Date: Aug. 13, 2012

(87) PCT Pub. No.: WO2011/098737
PCT Pub. Date: Aug. 18, 2011

(65) Prior Publication Data
US 2013/0000770 A1  Jan. 3, 2013

(30) Foreign Application Priority Data

Feb. 12, 2010  (FR) ...................................... 10 00590

(51) Int. Cl.
*E04F 17/04* (2006.01)
(52) U.S. Cl.
USPC ............................ 181/224; 415/119; 244/1 N
(58) Field of Classification Search
USPC ............................ 181/224; 244/1 N; 415/119
See application file for complete search history.

(56) References Cited

U.S. PATENT DOCUMENTS

| 5,894,114 A * | 4/1999 | Eigenmann .................. 181/224 |
| 6,752,240 B1 | 6/2004 | Schlagenhaft |
| 7,891,195 B2 | 2/2011 | Bouty et al. |
| 2004/0076512 A1 | 4/2004 | Lata Perez |
| 2006/0169532 A1 | 8/2006 | Patrick |
| 2007/0012508 A1 | 1/2007 | Demers |
| 2008/0185216 A1 | 8/2008 | Baude et al. |

(Continued)

FOREIGN PATENT DOCUMENTS

| EP | 0 036 356 | 9/1981 |
| EP | 1 391 597 | 2/2004 |
| EP | 1 744 033 | 1/2007 |
| FR | 2 905 984 | 3/2008 |

(Continued)

OTHER PUBLICATIONS

International Search Report Issued May 3, 2011 in PCT/FR11/50296 Filed Feb. 11, 2011.

(Continued)

*Primary Examiner* — Forrest M Phillips
(74) *Attorney, Agent, or Firm* — Oblon, Spivak, McClelland, Maier & Neustadt, L.L.P.

(57) ABSTRACT

A noise-attenuating covering configured for example for a pipe for guiding gases along a gas path. The covering includes a wall defining the gas path and at least one resonance cavity, the wall being pierced with holes for fluid communication between the gas path and the resonance cavity to attenuate noise. The holes have substantially identical diameters and, since the pipe is arranged to guide the gases in the downstream direction, a number of the openings per wall surface unit decreases continuously along the gas path in the downstream direction, such as to confer on the wall substantially constant acoustic resistance along the gas path, for which the noise attenuation is optimized along the gas path.

13 Claims, 2 Drawing Sheets

(56) References Cited

U.S. PATENT DOCUMENTS

| | | |
|---|---|---|
| 2009/0183943 A1* | 7/2009 | Leistner et al. ............... 181/224 |
| 2009/0318072 A1* | 12/2009 | Perera ........................... 454/194 |
| 2010/0077755 A1* | 4/2010 | Jangili et al. .................... 60/725 |
| 2010/0133378 A1* | 6/2010 | Lidoine ......................... 244/1 N |
| 2012/0051889 A1* | 3/2012 | Gamissans Bou ............ 415/119 |
| 2012/0055169 A1 | 3/2012 | Bouty et al. |
| 2012/0292127 A1* | 11/2012 | Teshima ....................... 181/224 |
| 2013/0142624 A1* | 6/2013 | Julliard et al. ................ 415/119 |

FOREIGN PATENT DOCUMENTS

| | | |
|---|---|---|
| FR | 2 915 522 | 10/2008 |
| GB | 460 148 | 1/1937 |
| JP | 10 16821 | 1/1998 |

OTHER PUBLICATIONS

U.S. Appl. No. 13/578,754, filed Aug. 13, 2012, Bouty, et al.

* cited by examiner

GAS-GUIDING PIPE COMPRISING A NOISE-ATTENUATING COVERING WITH VARIABLE POROSITY

BACKGROUND OF THE INVENTION

1. Field of the Invention

The invention relates to the field of reducing the noise in a gas-flow duct and more particularly in a gas turbine engine.

2. Description of the Related Art

A gas turbine engine for an aircraft such as an airplane or a helicopter usually comprises, from upstream to downstream in the direction of flow of the gases, one or more compressor stages, a combustion chamber, one or more turbine stages and a gas exhaust device such as a nozzle.

A constant problem for the engine manufacturers is the reduction of noise, notably for the comfort of the passengers and of the inhabitants of the zones overflown by the aircraft. In particular, helicopters travel close to inhabited zones and the noise of their exhaust nozzle forms a considerable component of the total noise that they generate. The attenuation of the noise leaving through the nozzle may be obtained by the use of an acoustic attenuation covering forming the inner wall of the nozzle and hence the outer jacket of the gas path. Such a covering may for example comprise a perforated metal sheet emerging on one or more resonance cavities, each assembly of a cavity and of one or more holes forming a Helmholtz resonator. The cavities may for example have a structure of the honeycomb type or of the tubular type.

Such attenuation coverings or acoustic treatment usually allow the attenuation of sound frequencies known to be average, for example of between 0.8 and 5 kHz. The sound frequencies that are treated depend notably on the depth of the resonance cavities that are therefore dimensioned accordingly.

BRIEF SUMMARY OF THE INVENTION

The objective of the present invention is to propose a duct for guiding gas comprising a noise-attenuation covering which allows an effective attenuation of the noise simply, at little cost and involving no heavy and/or bulky devices.

The invention applies particularly well to the attenuation of noise leaving the nozzle of a gas turbine engine of a helicopter. However, the Applicant has solved a more general problem of noise attenuation in a duct traveled through by a gas stream and intends to extend the scope of its rights to this application.

It is for this reason that the invention relates to a duct for guiding gas along a gas path, comprising a noise-attenuating covering, the covering comprising a wall delimiting the gas path and at least one resonance cavity, the wall being pierced with holes for placing the gas path in fluidic communication with the resonance cavity for the attenuation of noise, characterized by the fact that the holes have substantially equal diameters and that, said duct being arranged to guide the gases from upstream to downstream, the number of said holes per unit of surface area of the wall reduces continuously along the gas path, from upstream to downstream, in order to confer on said wall a substantially constant acoustic resistance along said gas path.

"Density of the holes" means the number of holes per unit of surface area of the wall; in other words, the density of holes on the wall corresponds to the porosity of the latter: the greater the density of holes, the more porous the wall. Continuous evolution of this density means a continuous evolution in the mathematical sense, that is to say a progressive evolution of which the various (discrete) values follow a continuous mathematical curve.

By virtue of the invention, the acoustic attenuation is improved in a spectacular manner and may in particular be optimized along the gas path. Specifically, the density of holes is an important parameters for the definition of the acoustic impedance (and more precisely the resistance) of the wall; since the density of the holes evolves along the gas path continuously, the acoustic resistance of the wall may be adapted along the path to the continuous variation of other parameters, which makes it possible to optimize this resistance and hence the acoustic attenuation as a function of the position along the wall of the duct. Notably this makes it possible to take account, along the wall of the duct, of the evolution of the sound level, of the speed of the gases or else of their temperature, which also influence the value of the resistance of the wall.

Finally, it is possible, by virtue of the variation of porosity, to compensate for the variation of the speed of the gases or of the sound level along the path in order to confer on the wall a substantially constant resistance along this path. The invention does not aim to multiply the frequency bands that may be attenuated by one and the same covering, but to optimize the attenuation of one specific frequency band, for example a band of average frequencies between 0.8 and 5 kHz.

Moreover, the acoustic treatment of such a nozzle is thus optimized; specifically, the reduction of the density of the holes causes an increase in the acoustic resistance of the wall between upstream and downstream. Moreover, the speed of the gases, but also the sound level, reduce in a nozzle from upstream to downstream, which causes a reduction in the acoustic resistance between the upstream and the downstream. Finally, the reduction in the density of the holes compensates for the reduction in the speed of the gases and in the sound level in order to confer on the wall a resistance that is stabilized along the gas path, this resistance, through a correct adaptation of the density of the holes, being able to be made substantially constant.

According to a preferred embodiment, the duct is a duct for guiding the gases of a gas turbine engine.

According to a preferred embodiment in this case, the duct is a gas exhaust nozzle.

According to a preferred embodiment, the number of holes per unit of surface area of the wall reduces by at least 5%, preferably between 5% and 10%, between an upstream end and a downstream end of said duct.

According to a preferred embodiment, since the duct extends generally along an axis, it is the longitudinal distance between successive holes that reduces continuously along the gas path, from upstream to downstream.

According to a preferred embodiment, since the duct extends generally along an axis, it is the transverse distance between successive holes that reduces continuously along the gas path, from upstream to downstream.

The invention also relates to a gas exhaust nozzle of a gas turbine engine comprising a duct for guiding gas conforming to the duct explained above.

The invention also relates to a gas turbine engine comprising a gas exhaust nozzle like that explained above.

BRIEF DESCRIPTION OF THE SEVERAL VIEWS OF THE DRAWINGS

The invention will be better understood with the aid of the following description of the preferred embodiment of the invention, with reference to the appended plates of drawings, in which.

DETAILED DESCRIPTION OF THE INVENTION

Figure 1:
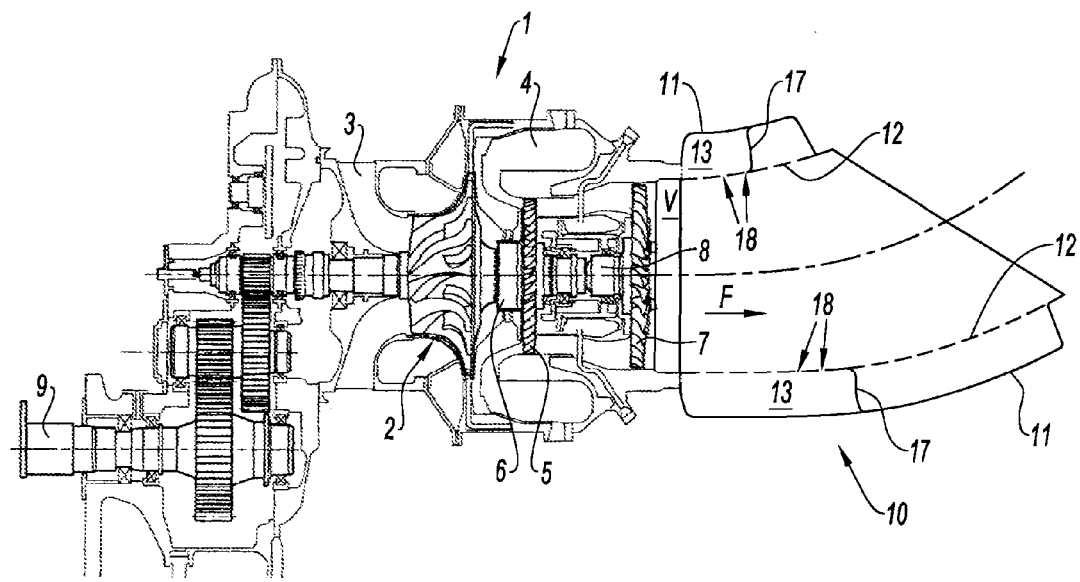
FIG. 1 represents a schematic view in section of a gas turbine engine for a helicopter with a nozzle with an acoustic covering according to the preferred embodiment of the invention.

With reference to FIG. 1, and in a known manner, a gas-turbine helicopter engine 1 comprises a compressor 2 (in this instance centrifugal and with only one stage) supplied with outside air through an annular air-intake channel 3, an annular combustion chamber 4 (which in this instance is a reverse-flow chamber) furnished with injectors (not shown) allowing it to be supplied with fuel for the combustion of the compressed gases originating from the compressor 2. The burnt gases drive a first turbine 5 (in this instance with only one stage), connected to the compressor 2 by a shaft 6 which secures them in rotation, and a second turbine 7 called a power turbine (in this instance with only one stage) connected by a shaft 8 to a gear set allowing a transfer of mechanical energy from the power turbine 7 to an output shaft 9 for example connected to a rotor driving the blades of the helicopter.

At the output of the power turbine 7, the engine 1 comprises a gas exhaust device 10, in this instance a gas exhaust nozzle 10, the function of which is to guide the exhaust gases along a path V carrying the gases or gas path V, from upstream to downstream. The direction of flow of the gases from upstream to downstream is indicated by an arrow F in the figures.

The nozzle 10 comprises an outer wall or shell 11 defining its outer casing and inside which an acoustic attenuation covering is mounted comprising a wall or skin or inner metal sheet 12 and a resonance cavity 13 arranged between the outer shell 11 and the inner wall 12. The inner wall 12 delimits the outer casing of the gas path V. This wall 12 is in this instance formed of a plurality of panels, in order to simplify its manufacture; it goes without saying that, according to another embodiment, the wall 12 may be formed in a single piece, in particular for an axisymmetric nozzle.

Figure 2:
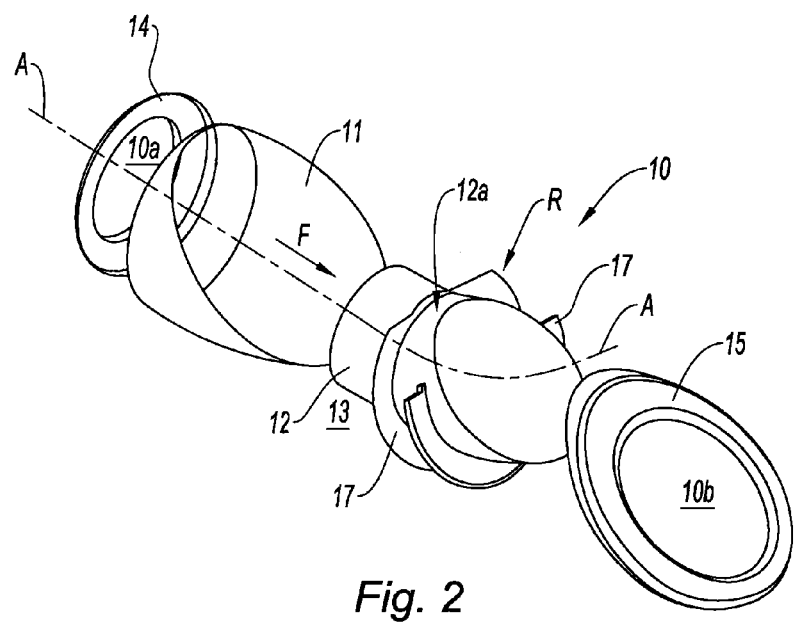
FIG. 2 represents an exploded schematic view in perspective of the nozzle of the engine of FIG. 1

The nozzle 10 extends generally along an axis A. More precisely, in this instance it has a curve in order to direct the gases leaving the nozzle in a preferred direction, which is useful in its application to a helicopter. This curve is visible in the representation of FIG. 2. In other words, the axis A of the nozzle 10 is curvilinear and follows a curve which represents the average trajectory of the gas stream or axis of exhausting of the gases. Specifically, the axis A corresponds to the curve that follows the centers of the successive sections of the gas path V. The concepts of longitudinal, radial, transverse, inner or outer are used in the rest of the description with reference to this general axis A of the nozzle 10, it being understood that at each longitudinal position the axis is in fact locally parallel to the inner wall 12 of the nozzle 10, said concepts therefore having the same meaning as for a cylindrical tubular duct but transposed to a curved tubular duct by analogy. Moreover it is understood that the following description (and more generally the invention) clearly also applies to a duct having a rectilinear axis of flow, for example a duct of generally cylindrical shape.

In addition to the curvature of its outer wall 11 and inner wall 12, the nozzle 10 is in this instance longer longitudinally on one side (the lower side in FIG. 2) than on the other (the upper side in FIG. 2), that is to say that its downstream aperture 10b is beveled. Quite clearly, the invention also applies to a downstream aperture plane perpendicular to the axis of exhausting of the gases at this aperture. The presence of a beveled downstream aperture is frequent for aircraft comprising two engines while a downstream aperture plane perpendicular to the axis of exhausting of the gases is frequent for aircraft comprising a single engine.

The nozzle 10 also comprises an upstream transverse wall 14 and a downstream transverse wall 15 the function of which is to close the cavity 13 arranged between the outer shell 11 and the inner wall 12. These walls 14, 15 define an upstream aperture 10a and a downstream aperture 10b of the nozzle 10. The link between the inner wall 12 and the transverse walls 14, is preferably sliding in order to allow the absorption of the differential thermal expansions.

Moreover, stiffening walls 17 or stiffeners 17 or reinforcers 17 are placed transversely between the outer shell 11 and the inner wall 12 in order to stiffen the assembly; the nozzle 10 in this instance comprises two stiffeners 17 which are generally annular in shape but are not axisymmetric, because they are truncated on a portion of their circumference corresponding to a concave zone 12a of the inner wall 12, this concave zone 12a resulting from its generally curved shape. Because of the presence of the stiffeners 17, the cavity 13 is partitioned into several cavities; these cavities may or may not be able to intercommunicate.

The stiffeners 17 may fulfill a second function of acoustic attenuation for applying a treatment called a localized reaction treatment. Thus, they make it possible to partition the acoustic treatment cavity 13 and hence to adapt the acoustic frequencies that it attenuates; finally, this involves giving the cavity 13 a honeycomb structure of greater or lesser volumes.

The inner wall 12 is perforated with a plurality of holes 18 for placing the gas path V in fluidic communication with the resonance cavity 13. These holes 18 emerge on either side of the inner wall 12.

Figure 3:
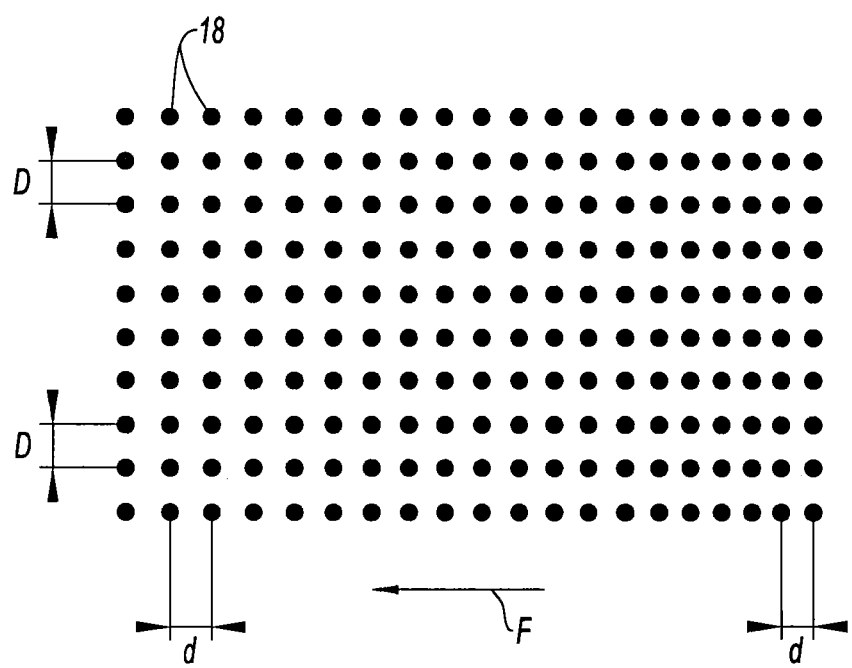
FIG. 3 is a schematic representation of the distribution of the holes of the acoustic covering of FIG. 1 on the wall of the nozzle represented flat.

FIG. 3 represents schematically the distribution of the holes 18 on the inner wall 12 of the nozzle 10; more precisely, FIG. 3 represents the holes 18 as they are distributed locally, that is to say over a portion of the inner wall 12 with sufficiently small dimensions so that it is possible to consider that it is flat. The holes 18 have equal diameters and in this instance are distributed in a square mesh distribution. Their density evolves continuously along the gas path V, that is to say in this instance along the generally curvilinear axis A of the nozzle 10, from upstream to downstream (upstream being, in this figure, situated on the right). "Density of holes" means the number of holes per unit of surface area of the wall 12. In this instance, it is the space d between two successive holes 18 in the direction of flow of the gases, that is to say in the direction of the curvilinear axis A of the nozzle 10, in other words, the longitudinal space d between two successive holes which evolves continuously along the inner wall 12.

In this instance, the density of the holes 18 reduces continuously from the upstream to the downstream of the nozzle 10 along the gas path V, that is to say that the distance d between successive holes increases from upstream to downstream. Moreover, the transverse or circumferential distance between successive holes 18 of one and the same transverse row is in this instance constant (it is the curvilinear distance D between two holes 18 in a plane transverse to the inner wall 10).

The value and the evolution of the density of the holes 18 along the inner wall 12 are determined empirically. An optimal distribution of the holes 18 depends on the evolution of a plurality of parameters between the upstream aperture 10*a* and the downstream aperture 10*b* of the nozzle 10 and notably:

the evolution of the speed of flow of the gases;
the evolution of the temperature of the gases;
the evolution of the sound level, which varies notably due to its attenuation by the acoustic attenuation covering formed by the inner wall 12 and the resonance cavity 13.

The evolution of the distribution of the holes 18 makes it possible to match the acoustic impedance (and more precisely the resistance) of the inner wall 12 of the acoustic covering R to the evolution of the parameters above and, if possible, to make it substantially constant along the wall 12, as already explained above. The impedance can thus be matched in order to be locally optimized, in each longitudinal position, relative to the parameters above.

For example, in order to define empirically the density of the holes 18 along the inner wall 12, it is possible to apply the following method:

in a first step, determine the minimum sound level (at the outlet 10*b*) and maximum sound level (at the inlet 10*a*) that are possible in the nozzle 10 and the minimum speed (at the outlet 10*b*) and maximum speed (at the inlet 10*a*) of the gases;

in a second step, calculate the corresponding optimal acoustic impedances in order to obtain the best acoustic attenuation at the inlet 10*a* and at the outlet 10*b* of the nozzle 10;

in a third step, carry out an interpolation (linear or nonlinear) between the impedances computed at the upstream end 10*a* and downstream end 10*b* of the nozzle 10 in order to determine a preferred impedance between these two optimal impedances;

in a fourth step, deduce therefrom the value of the density of the holes 18 that is necessary to obtain this impedance.

Thus, it is possible to tune the acoustic attenuation covering to a given frequency band (by adjusting the depth of the cavity 13, as explained below) and to match the acoustic impedance of the inner wall 12 of this covering R and hence the effectiveness of the latter in optimizing the resulting acoustic attenuation. Compared with a nozzle with a regular piercing, the acoustic attenuation can be improved by 50% (attenuation of 3 dB as opposed to an attenuation of 2 dB with a regular piercing). This solution is all the more advantageous in that it involves no additional parts, only the piercing of the inner wall 12 according to an evolving density making it possible to achieve the expected results.

Preferably, the evolution of the density of the holes 18 between the inlet 10*a* of the nozzle 10 and its outlet 10*b* is greater than or equal to 5%, preferably between 5% and 10%. In other words, in this instance, the longitudinal distance d between successive holes 18 at the outlet 10*b* of the nozzle 10 is at least 5% greater than the longitudinal distance d between successive holes 18 at the inlet 10*a* of the nozzle 10.

The frequency tuning of the acoustic attenuation covering R (that is to say the determination of the main frequencies that it attenuates) is carried out notably by adjusting the volume of the cavity 13 and more particularly by adjusting its radial depth. Specifically, the acoustic attenuation covering R operates according to the principle of a resonator called a "quarter-wave resonator", that is to say of a resonator of which the depth is equal to a quarter of the wavelength of the central frequency of the frequency band that it attenuates. Thus, the more it is desired to attenuate high frequencies, the shallower must be the radial depth of the cavity 13. Conversely, the more it is desired to attenuate low frequencies, the deeper must be the radial depth of the cavity 13. As a function of the frequencies to be attenuated, the cavity 13 may moreover be partitioned into a plurality of cavities (the partitions being able to be longitudinal or transverse), in order to modulate the acoustic treatment; it is furthermore possible, in this case, to use a structure of the honeycomb type; the partitions may also fulfill a function of mechanical maintenance and that is why the stiffeners 17 described above may fulfill this function of partitions in order to adjust the acoustic treatment. The length or axial dimension of the cavity 13 for its part acts on the rate or effectiveness of the resultant acoustic attenuation.

By adjusting the depth of the cavity 13, it is therefore possible to choose the frequency ranges to be attenuated. Preferably, frequencies between 0 and 12 kHz, advantageously between 0.8 and 5 kHz and more particularly between 2 and 2.5 kHz are attenuated. For example, to attenuate a frequency band centered on approximately 2 kHz, it is possible to provide a single cavity 13 (or in this instance partitioned only by two mechanical maintenance stiffeners 17) with a radial depth equal to 4 cm with holes with a diameter equal to 1.2 mm, a perforation ratio varying (from upstream to downstream) from 8 to 10%, the metal sheet in which the holes are pierced having a thickness equal to 1 mm.

The various elements forming the nozzle 10 are preferably made of metal, for example formed in nickel-based steel or in titanium.

The invention has been presented with reference to a distribution of the holes 18 with a square mesh, but it goes without saying that other distributions can be envisaged. The evolution of the density of the holes 18 of these distributions may then be carried out, as above, by the evolution of the longitudinal distance between the holes; thus, the distribution of the holes being defined by longitudinal and transverse relationships between successive holes, the longitudinal component of the distribution is made to evolve along the gas path V. For example, if the distribution is of the diamond-shaped type with a large longitudinal axis and a small transverse axis, it is possible to define an evolution of the large-axis distance of the diamond shapes formed by successive holes.

The invention has been presented with reference to a continuous evolution of the density of the holes obtained by varying the longitudinal distance between successive holes. According to another embodiment not shown, it is the transverse (that is to say circumferential) distance between successive holes transversely that evolves along the gas path V. Thus, in the case of a square mesh for example, from one transverse row of holes to another, the distance separating the successive holes of one and the same transverse row increases or decreases continuously along the gas path V.

According to a particular embodiment, it is the longitudinal and transverse distances that evolve continuously along the gas path V.

The description has been made with reference to a gas turbine engine comprising a single nozzle. The invention applies to other types of nozzles, for example to the nozzles comprising a diffuser and an ejector such as for example that shown in document F 2,905,984 in the name of the Applicant, the covering of the invention in this case being placed on the inside of the ejector.

The invention applies more generally to a duct for guiding a gas stream, in particular a duct of a gas turbine engine. In particular, the invention applies to an air-intake channel in a gas turbine engine, for example to an annular duct 3 like that shown in FIG. 1 or to an air inlet duct of a fan of a turbojet intended to be used in an airplane. In this case, preferably, the density of holes reduces gradually as they move away from the compressor or from the fan, that is to say from downstream to upstream.

The invention has been presented with reference to an evolution of the density of the holes from the inlet 10a of the duct 10 to its outlet 10b. It goes without saying that, if only a portion of the nozzle 10 is treated, the evolution of the density of the holes 18 takes place on only this portion.

The invention claimed is:

1. A duct for guiding gas along a gas path, comprising:
an outer wall;
a noise-attenuating covering disposed inside the outer wall, the covering comprising an inner wall delimiting the gas path and at least one resonance cavity arranged between the outer wall and the inner wall, the inner wall being pierced with holes for placing the gas path in fluidic communication with the at least one resonance cavity for the attenuation of noise; and
upstream and downstream transverse walls which close the at least one resonance cavity at upstream and downstream ends of the at least one resonance cavity, respectively,
wherein the upstream and downstream transverse walls define upstream and downstream apertures of the duct, respectively,
wherein the holes have substantially equal diameters, and
wherein the duct guides the gas from upstream to downstream, and a number of the holes per unit of surface area of the inner wall reduces continuously along the gas path, from upstream to downstream, to confer on the inner wall a substantially constant acoustic resistance along the gas path.

2. The duct as claimed in claim 1, wherein the number of holes per unit of surface area of the wall reduces by at least 5% between an upstream end and a downstream end of the duct.

3. The duct as claimed in claim 1, wherein the duct extends generally along an axis, and a longitudinal distance between successive holes reduces continuously along the gas path from upstream to downstream.

4. A gas exhaust nozzle of a gas turbine engine comprising:
a duct for guiding gas as claimed in claim 1.

5. A gas turbine engine comprising:
a gas exhaust nozzle as claimed in claim 4.

6. The duct as claimed in claim 1, wherein the upstream and downstream transverse walls are in contact with the inner wall.

7. The duct as claimed in claim 6, wherein the upstream and downstream transverse walls are in sliding contact with the inner wall.

8. The duct as claimed in claim 1, wherein the at least one resonance cavity is a single cavity with a plurality of openings.

9. The duct as claimed in claim 1, further comprising stiffeners placed transversely between the outer wall and the inner wall which stiffen the duct.

10. The duct as claimed in claim 2, wherein the number of holes per unit of surface area of the wall reduces by between 5% and 10% between the upstream end and the downstream end of the duct.

11. The duct as claimed in claim 1, wherein the duct extends generally along an axis, and a transverse distance between successive holes reduces continuously along the gas path from upstream to downstream.

12. The duct as claimed in claim 11, wherein the axis is curvilinear.

13. The duct as claimed in claim 11, wherein the axis is rectilinear.

* * * * *